US006836242B1

(12) United States Patent
Batzer et al.

(10) Patent No.: US 6,836,242 B1
(45) Date of Patent: Dec. 28, 2004

(54) METHOD AND APPARATUS PROVIDING GENERAL SPHERICAL SEARCH PATTERN, AND ALL SUB-SETS THEREOF, FOR ACQUISITION

(75) Inventors: Patricia F. Batzer, North Salt Lake, UT (US); Merle L. Keller, Salt Lake City, UT (US)

(73) Assignee: L-3 Communications Corporation, New York, NY (US)

( * ) Notice: Subject to any disclaimer, the term of this patent is extended or adjusted under 35 U.S.C. 154(b) by 0 days.

(21) Appl. No.: 10/783,047

(22) Filed: Feb. 19, 2004

(51) Int. Cl.[7] .................................................. H04B 7/00
(52) U.S. Cl. ........................ 342/367; 342/371; 342/372
(58) Field of Search ............................ 342/74, 78, 367, 342/371, 372, 425; 455/25; 343/754, 757

(56) References Cited

U.S. PATENT DOCUMENTS 3,772,695 A * 11/1973 Hoffman ...................... 342/77
3,781,886 A * 12/1973 Lank et al. ................... 342/78
3,842,417 A * 10/1974 Williams .................... 342/158
4,034,374 A * 7/1977 Kruger ....................... 342/155
4,814,779 A * 3/1989 Levine ....................... 343/754
5,701,583 A * 12/1997 Harbin et al. ................. 455/25
6,201,496 B1 * 3/2001 Lee ............................ 342/90

* cited by examiner

*Primary Examiner*—Dao Phan
(74) *Attorney, Agent, or Firm*—Harrington & Smith, LLP

(57) ABSTRACT

Disclosed is a method, apparatus and a computer readable media that provide an ability for a first platform and a second platform to obtain information that is descriptive of a relative location of the other. The method includes establishing an initial antenna pointing direction of the first and second platforms such that the pointing directions are opposite one another, and incrementally scanning each antenna in azimuth in the same direction in synchronism with one another in a plane referenced to a common reference plane until each antenna is within the other antenna's azimuth and elevation beamwidth during a scanning increment dwell time ($T_{DWELL}$). Upon completing a scan in azimuth in the plane, the method changes an elevation angle of each antenna pointing direction relative to the plane by equal and opposite amounts, and repeats the incremental scanning of each antenna in azimuth in the same direction.

15 Claims, 12 Drawing Sheets

SUBSET CASE: AIR-TO-AIR ACQUISITION IN TANGENT PLANE.
ACQUISITION DETECT AT TIME = t8

SUBSET CASE: AIR-TO-AIR ACQUISITION IN TANGENT PLANE.

ACQUISITION DETECT AT TIME = t8

SUBSET CASE: AIR-TO-AIR ACQUISITION IN TANGENT PLANE.

ACQUISITION DETECT AT TIME = t5

SUBSET CASE: AIR-TO-AIR ACQUISITION IN TANGENT PLANE.

ACQUISITION DETECT AT TIME = t5

SUBSET CASE: AIR/AIR OR GND/AIR ACQUISITION WITH
A PRIORI KNOWLEDGE: EAST/WEST AND ABOVE/BELOW

SUBSET CASE: AIR/AIR OR GND/AIR ACQUISITION WITH
A PRIORI KNOWLEDGE: EAST/WEST AND ABOVE/BELOW

SUBSET CASE: AIR/AIR OR GND/AIR ACQUISITION WITH A PRIORI KNOWLEDGE: EAST/WEST AND ABOVE/BELOW

METHOD AND APPARATUS PROVIDING GENERAL SPHERICAL SEARCH PATTERN, AND ALL SUB-SETS THEREOF, FOR ACQUISITION

TECHNICAL FIELD

This invention relates generally to techniques for one platform to acquire another for the purposes of establishing a communications path there between and, more specifically, relates to method and apparatus providing a spatial search pattern to enable a first terrestrially-based or airborne platform to acquire a second terrestrially-based or airborne platform for establishing a point-to-point communications path.

BACKGROUND

A problem arises when two platforms, such as two airborne platforms, are required to establish a point-to-point, line-of-sight (LOS) communications path between themselves using one or more directional antennas (i.e., where at least one antenna must be pointed at the other). In this case the two platforms may not have any a priori knowledge of the location of the other in three dimensional space, nor any knowledge of the relative heading of the other platform, nor any knowledge of the speed of the other platform. As can be appreciated, this set of conditions can severely complicate the initial acquisition phase, and can result in an inordinately long period of time where each platform searches for the other (such as by transmitting a probe or acquisition signal, and attempting to receive a corresponding probe or acquisition signal from the other platform). The initial acquisition phase can be contrasted with the subsequent tracking phase where, after the point-to-point communication path has been successfully established, the antennas of the two platforms can remain pointing at one another using conventional closed-loop feedback techniques.

While the acquisition problem can be most troublesome when the two platforms are both airborne, similar problems exist where one platform is terrestrially sited, and the other is airborne, or even when both platforms are terrestrially-based, especially in terrain characterized by changes in elevation, such as hilly or mountainous terrain. As employed herein two ships at sea are also considered to be examples of two platforms that are terrestrially-based.

While it may be possible to provide special transmitters and/or receivers (e.g., having larger beamwidths than those used for communications) to aid in the initial acquisition phase, this is an undesirable approach in that it adds cost, weight and complexity to each platform.

SUMMARY OF THE PREFERRED EMBODIMENTS

The foregoing and other problems are overcome, and other advantages are realized, in accordance with the presently preferred embodiments of these teachings.

In one aspect this invention provides a method for a first platform and a second platform to obtain information that is descriptive of a relative location of the other. The method includes establishing an initial antenna pointing direction of the first and second platforms such that the pointing directions are opposite one another, and incrementally scanning each antenna in azimuth in the same direction in synchronism with one another in a plane referenced to a common reference plane until each antenna is within the other antenna's azimuth and elevation beamwidth during a scanning increment dwell time ($T_{DWELL}$). Upon completing a scan in azimuth in the plane, the method changes an elevation angle of each antenna pointing direction relative to the plane by equal and opposite amounts, and repeats the incremental scanning of each antenna in azimuth in the same direction.

A further aspect of this invention provides an acquisition method for use in establishing a line-of-sight communication path between a first antenna of a first platform and a second antenna of a second platform. This method includes (a) defining a first spherical search space that is centered on the first antenna and a second spherical search space that is centered on the second antenna, each spherical search space being characterized by having lines of longitude corresponding to antenna azimuth pointing directions and lines of latitude corresponding to antenna elevation pointing directions, where an equatorial plane of each spherical search space is referenced to a plane that is tangent to the surface of the Earth; (b) establishing an initial antenna pointing direction of the first and second antennas such that the pointing directions are opposite one another referenced to an Earth-based coordinate system; and (c) operating within the spherical search space or a subset of the spherical search space by incrementally scanning each antenna in azimuth in the same direction in synchronism with one another, and upon completing a scan in azimuth, changing an elevation angle of each antenna relative to the equatorial plane in synchronism with one another, and repeating the incremental scanning of each antenna in azimuth in the same direction until each antenna is within the other antenna's azimuth and elevation beamwidth during $T_{DWELL}$.

In the presently preferred embodiment the beamwidth of the first antenna differs from the beamwidth of the second antenna, a minimum value of $T_{DWELL}$ is common for both antennas, and where a minimum antenna step size is a function of the smallest beamwidth.

Apparatus that operates in accordance with this invention is also disclosed, as is a computer readable media that stores computer instructions for implementing a computer program to cause the computer to execute an acquisition method for use in establishing the line-of-sight communication path between the first antenna of the first platform and the second antenna of the second platform, in accordance with this invention.

BRIEF DESCRIPTION OF THE DRAWINGS

The foregoing and other aspects of these teachings are made more evident in the following Detailed Description of the Preferred Embodiments, when read in conjunction with the attached Drawing Figures, wherein:

FIG. 7 is a two dimensional view and FIGS. 8, 9 and 10 are each a three dimensional view;

DETAILED DESCRIPTION OF THE PREFERRED EMBODIMENTS

This invention provides a spherical spatial search pattern, and all subsets of the sphere, for two antennas that are expected to form a point-to-point, LOS communication path at an instant in time for acquisition purposes. Both antennas could be directional antennas, or one may be directional and the other fixed. As an example, one or both antennas could be switched horn arrays or equivalents thereto. Each antenna center corresponds to the center of an associated sphere. Each antenna's local navigational position forms a local tangent coordinate frame (e.g., one having an East axis, a North axis, and an up axis) in terms of Earth-centered, Earth-fixed coordinates.

Figure 1A:
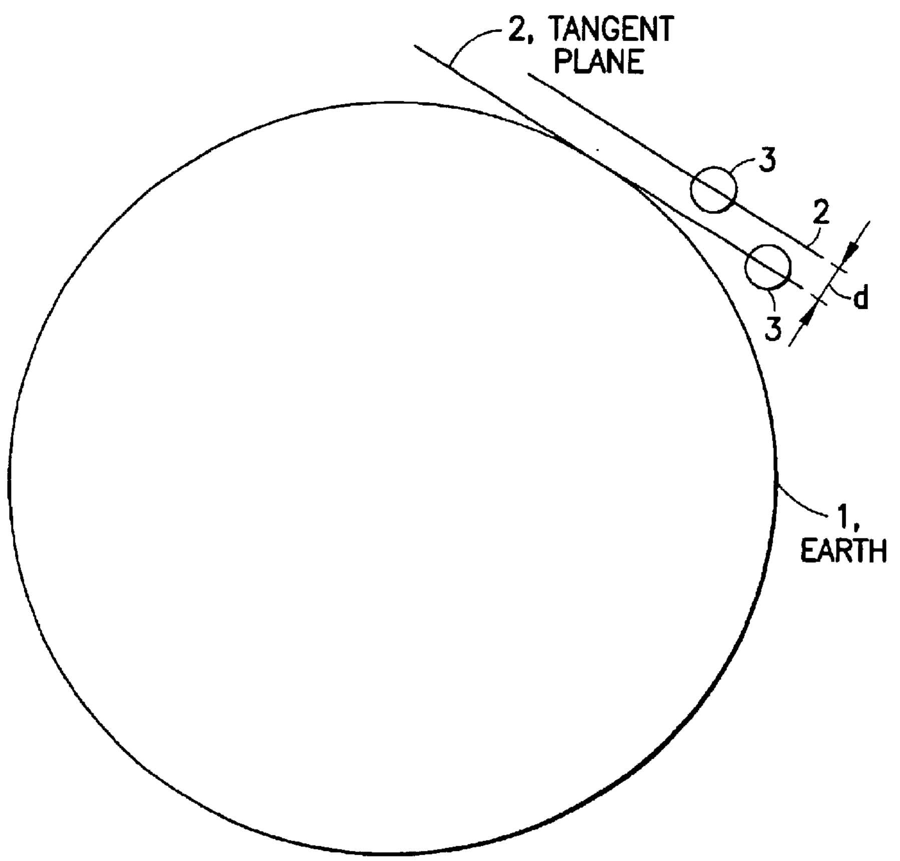
FIGS. 1A and 1B are diagrams that are useful in explaining the spherical search pattern in accordance with this invention.
Figure 1B:
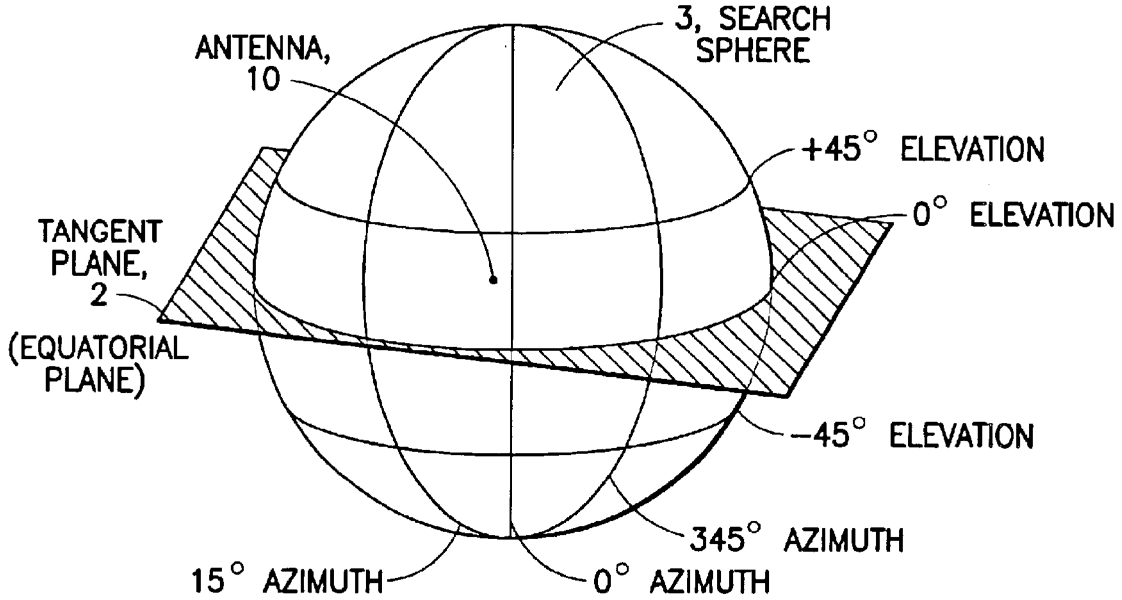

Referring to FIGS. 1A and 1B, a search sphere 3 is centered at the origin of each local tangent coordinate frame, and a tangent plane 2 (a plane that is tangent to the surface of the Earth 1) lies along the equator (O degrees elevation) of the search sphere 3. Note that the tangent plane 2 may be offset from the surface of the Earth 1 by some distance d.

Each search sphere 3 can be divided into latitude circles (constant elevation contours) from +90 to −90 degrees and into longitude circles that correspond to azimuth ranging from 0 to 360 degrees.

Figure 2:
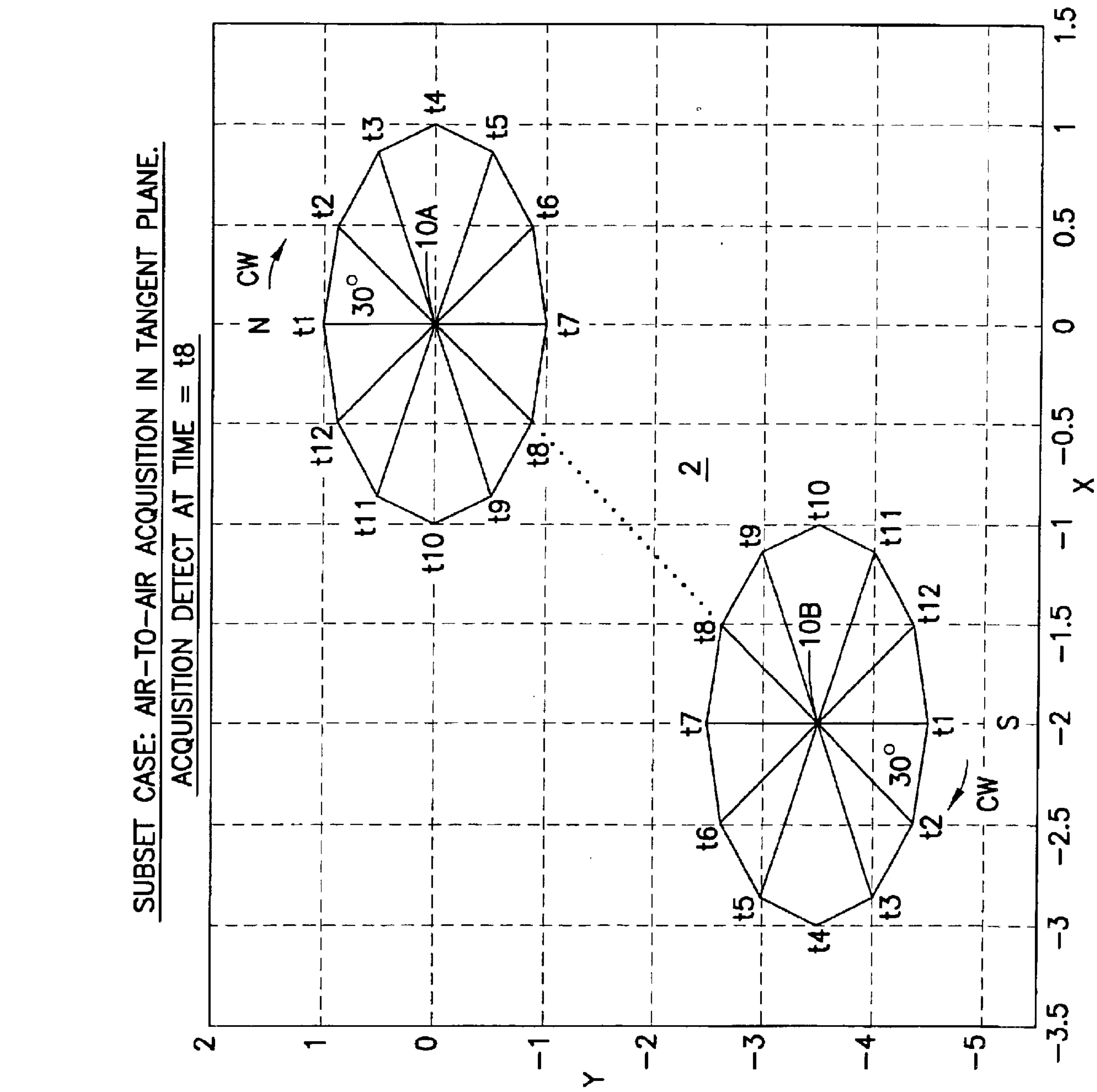
FIG. 2 illustrates an air-to-air acquisition example where both platforms lie in the same tangent plane, and where acquisition is detected at time T8.

Referring now also to FIG. 2, each antenna 10 begins its search 180 degrees out of phase relative to the other antenna with respect to both latitude (elevation) and longitude (azimuth). In this example antenna 10A begins its search at time T1 pointing North, while antenna 10B begins its search at time T1 pointing South. Alternatively, one antenna could be pointing East, and the other West, or one could be pointing NW, and the other pointing SE, etc. The search for each antenna 10A, 10B is preferably time synchronized using Global Positioning Satellite (GPS) time or any other suitable time reference. Any uncertainty between the clocks of antennas 10A, 10B, and thus any temporal difference between their (ideally) common and equal time base, is preferably covered by the dwell time within each spatial cell (assumed in the example of FIG. 2 to have a width of 15 degrees). At time-synchronized instants (T2, T3, etc.) each antenna 10A, 10B steps to a next azimuth line and, if all azimuth lines are covered for a current elevation, then each antenna 10A, 10B steps to a next latitude (elevation) line (equal and opposite), and then steps through the longitude (azimuth) lines, with each antenna 10A, 10B moving either clockwise or counterclockwise in azimuth. Each antenna 10A, 10B resides in a spatial cell (having a size that is a function of beamwidth and range) and checks for acquisition until the predetermined dwell time elapses. The search then continues to the next spatial cell until acquisition is detected. Changes in local platform attitude may be processed such that the local elevation and azimuth accommodates local attitude changes. Stated another way, the directional antenna pointing follows a fixed pattern regardless of platform heading, pitch, and roll.

FIG. 2 illustrates an air-to-air acquisition example where both platforms, one associated with antenna 10A and the other with antenna 10B, lie in the same tangent plane 2 and are assumed to be contained within altitude (elevation) envelope, where antennas 10A and 10B both proceed clockwise(CW) and where acquisition occurs at T8. That is, both antennas 10A and 10B are within each others azimuth beamwidth at T8. The view in FIG. 2 is one looking down on the three-dimensional space that contains the two platforms having antennas 10A and 10B.

Figure 3:
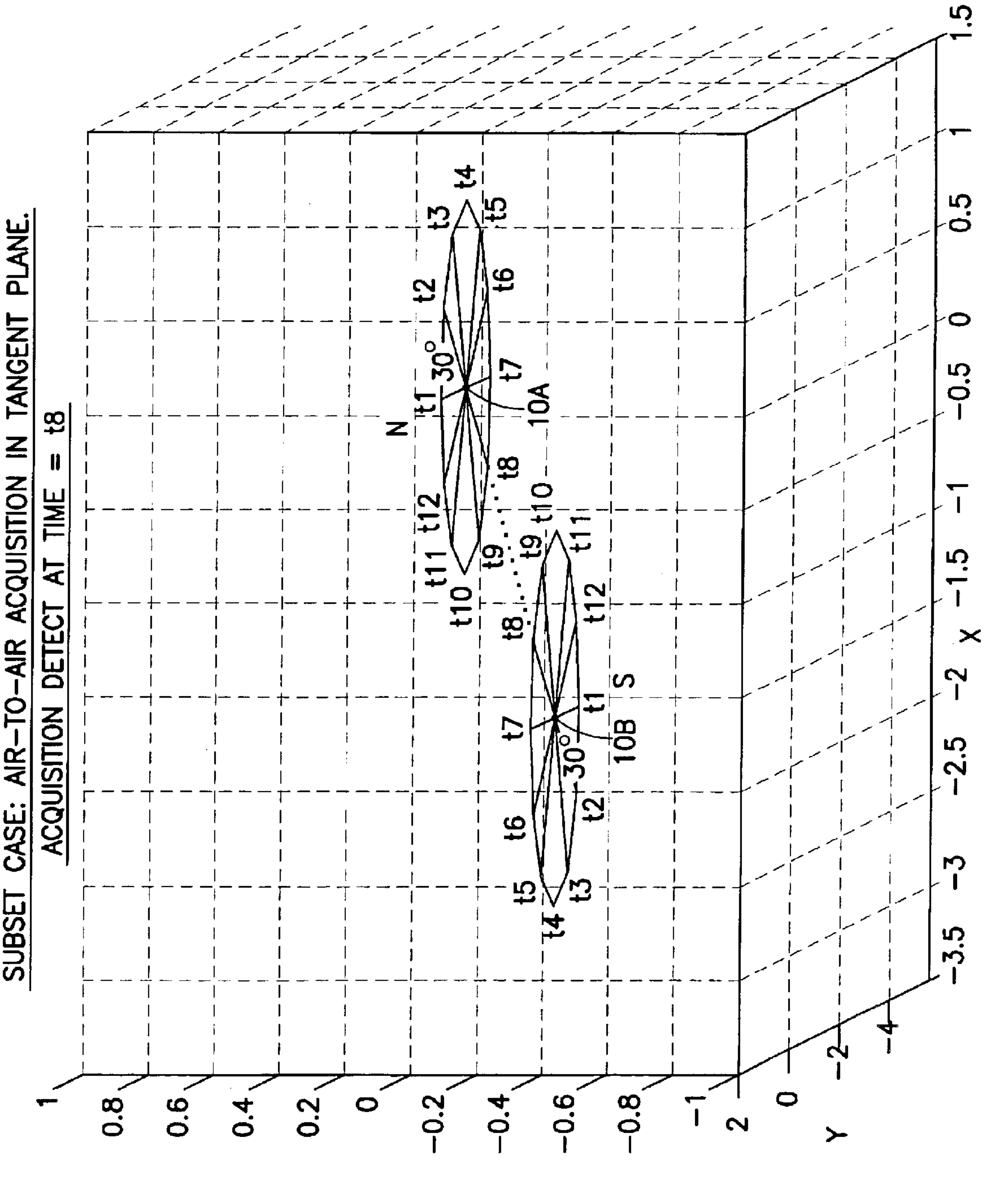
FIG. 3 shows another view of the example of FIG. 2 in three dimensional space.

FIG. 3 is another view of the example of FIG. 2 in three dimensional space, where the "in tangent plane search" concept applies when both platforms are within some altitude difference from one another (an altitude or elevation envelope) that is within the antenna elevational beamwidth.

Note that for two platforms on the surface of the earth, such as two ships at sea, the altitude envelope may be considered to essentially collapse to zero.

Figure 4:
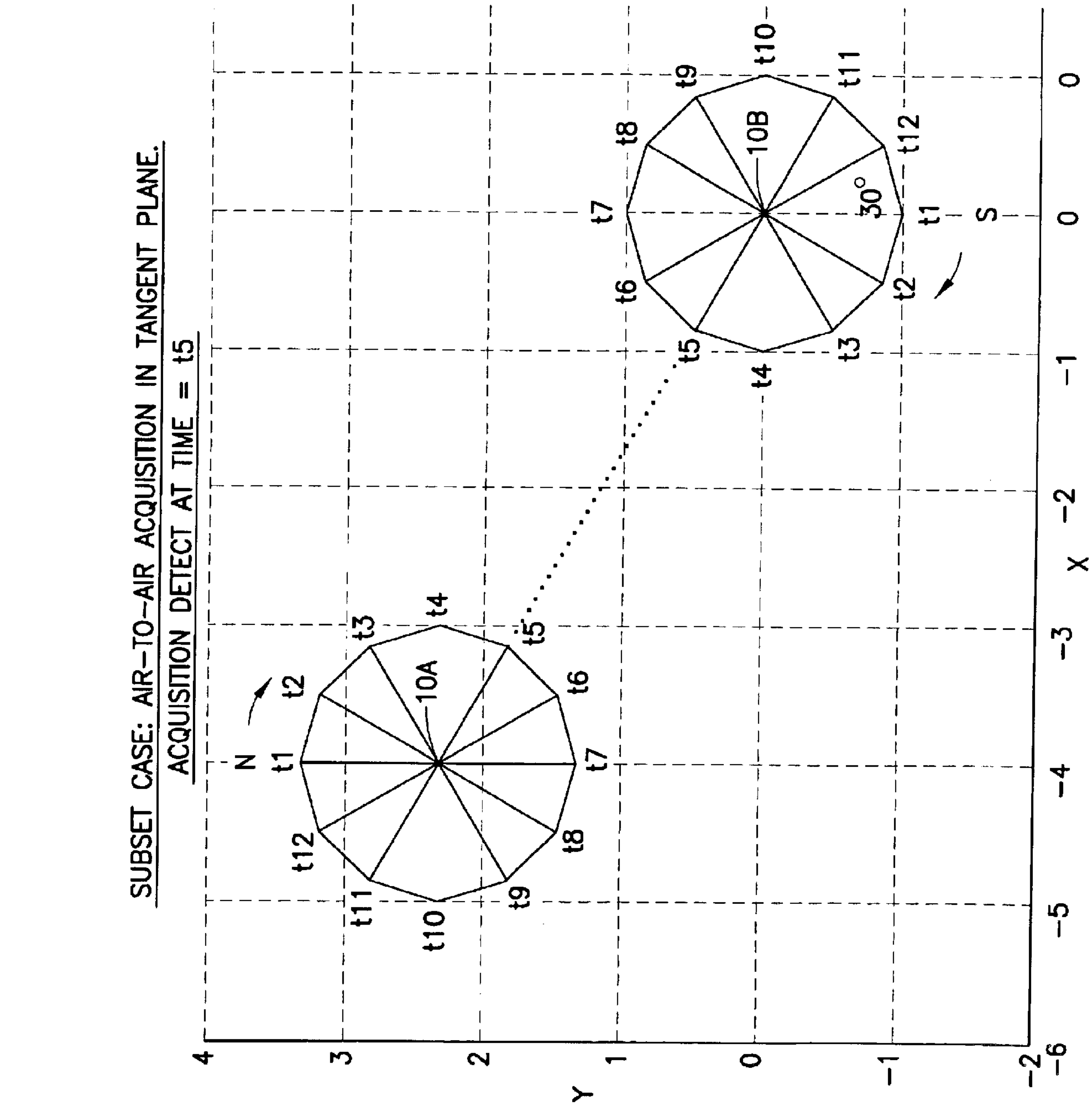
FIG. 4 illustrates another air-to-air acquisition example where both platforms lie in the same tangent plane, and where acquisition is detected at time T5.
Figure 5:
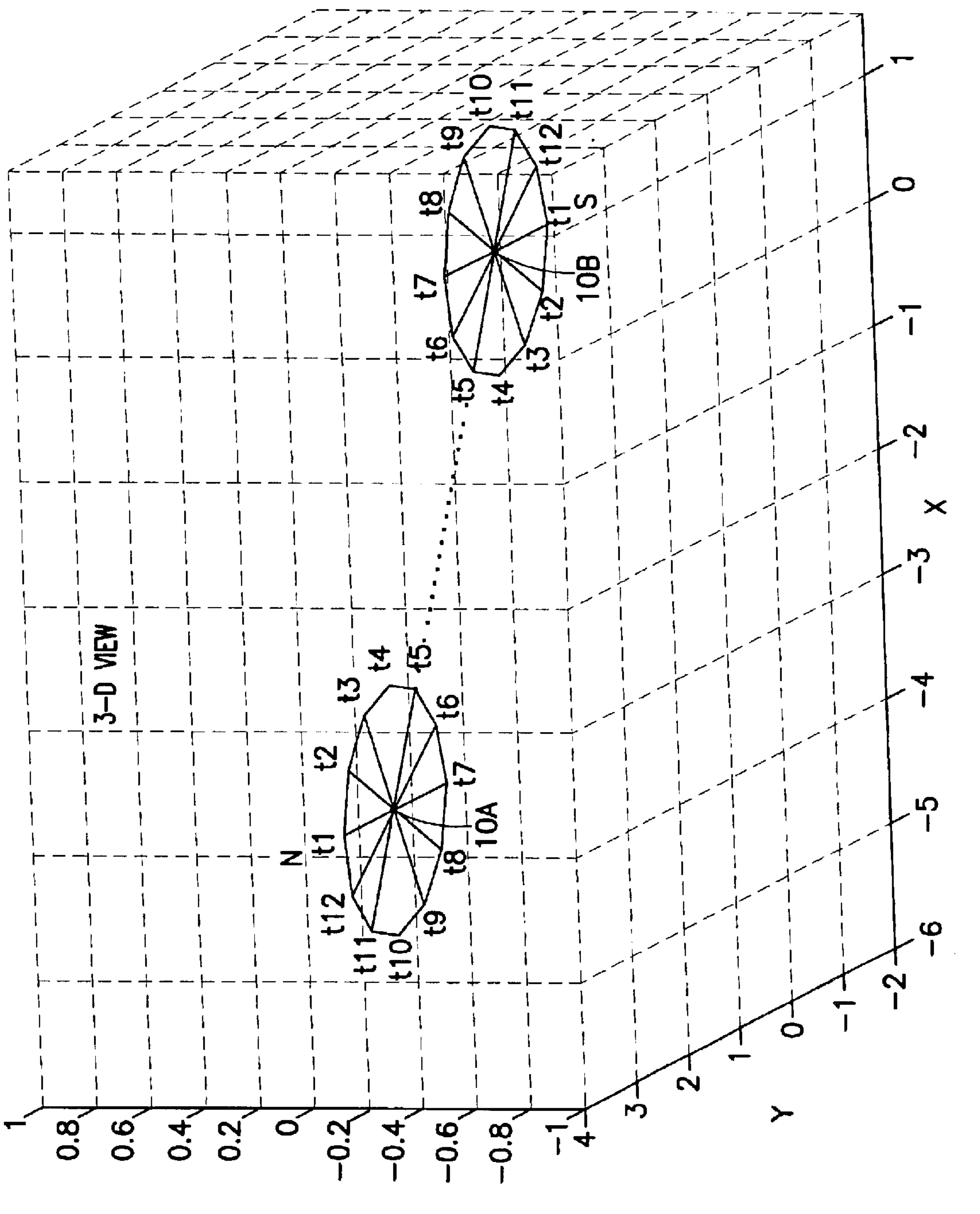
FIG. 5 shows the example of FIG. 4 in three dimensional space.
Figure 6:
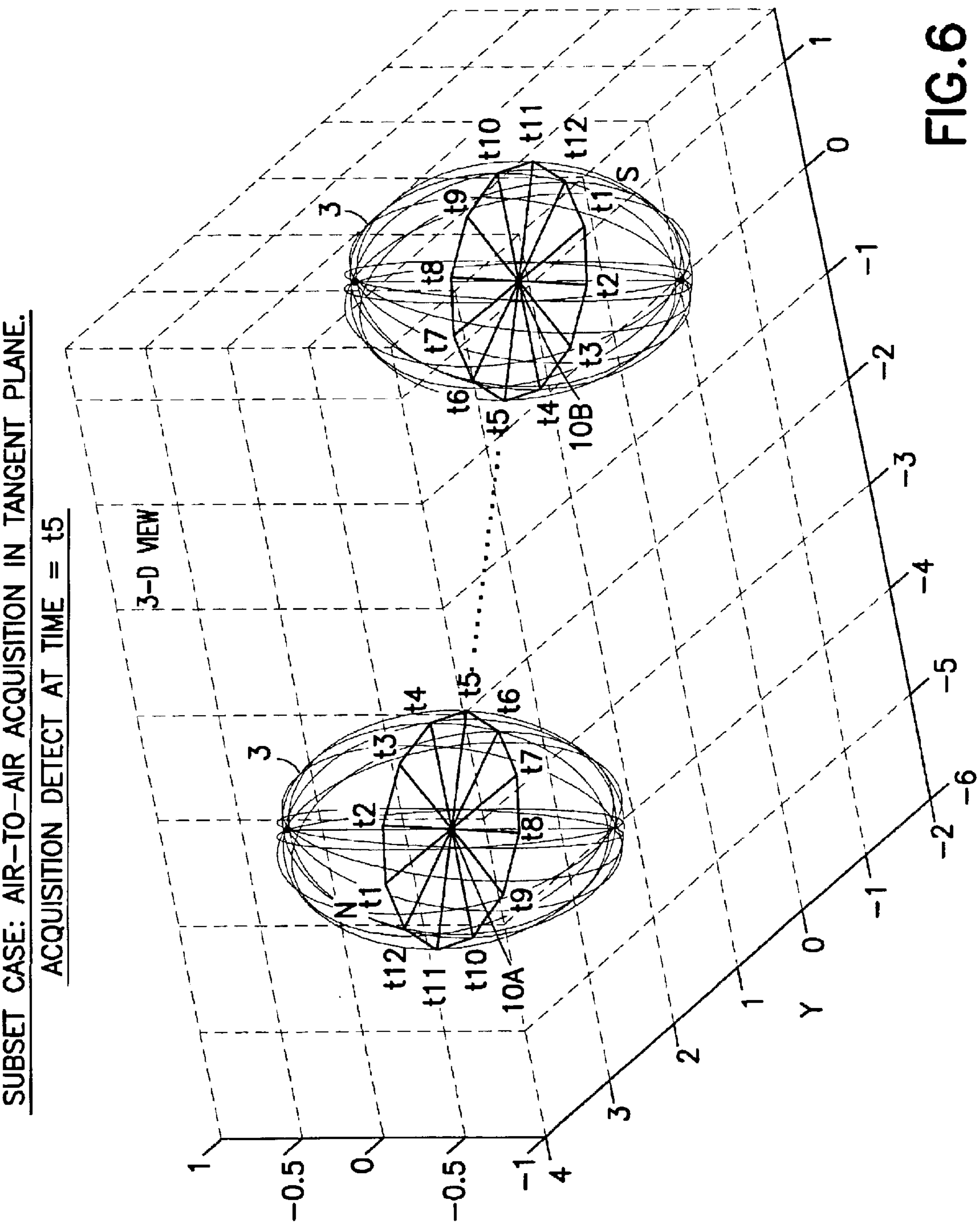
FIG. 6 is a three dimensional view of the air-to-air acquisition example of FIGS. 4 and 5, and shows the search sphere surrounding each antenna.
Figure 7:
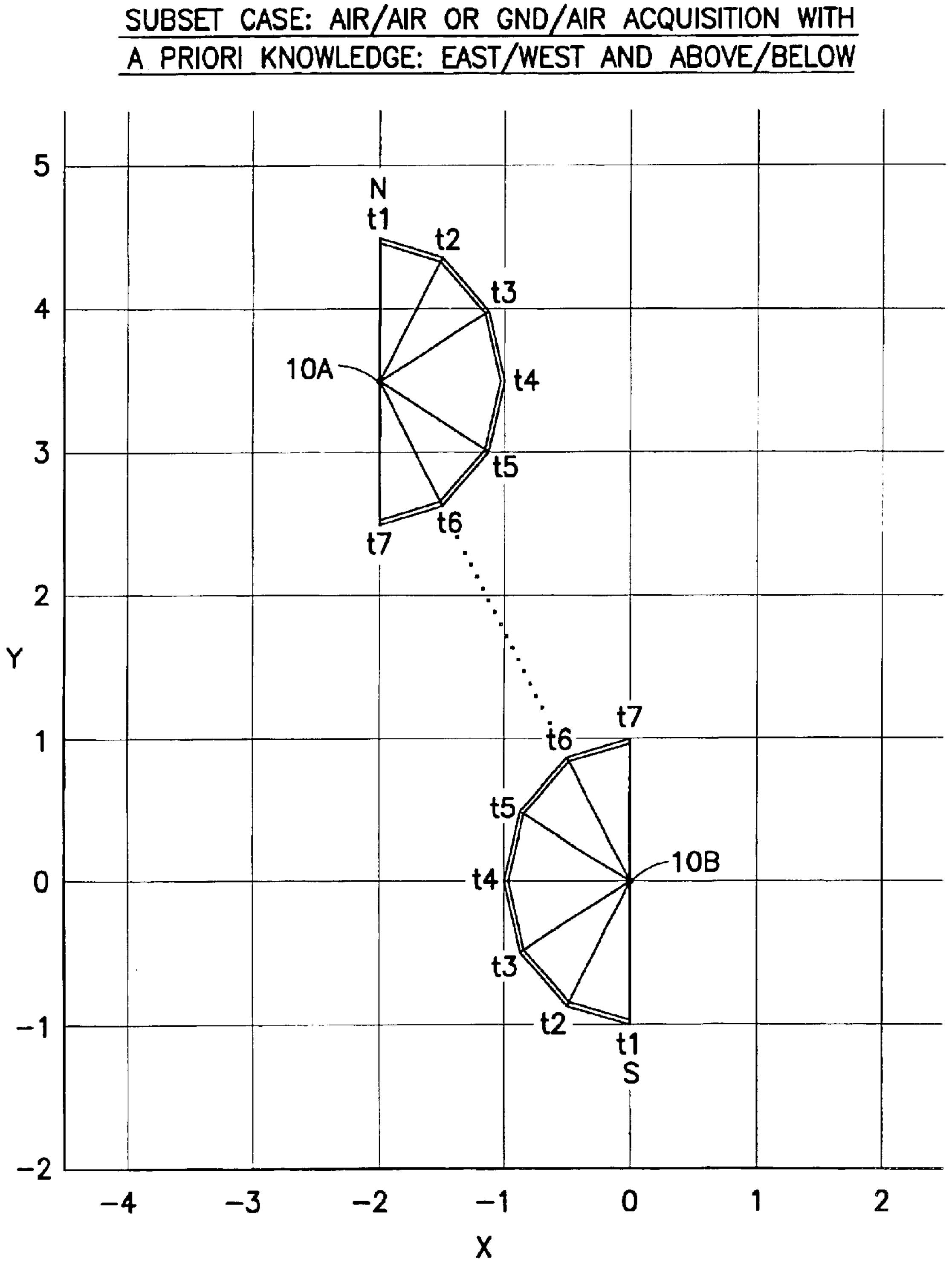
FIGS. 7, 8, 9 and 10 illustrate an air-to-air, or a ground-to-air configuration example, where both antennas must search through elevation as well as azimuth, where
Figure 8:
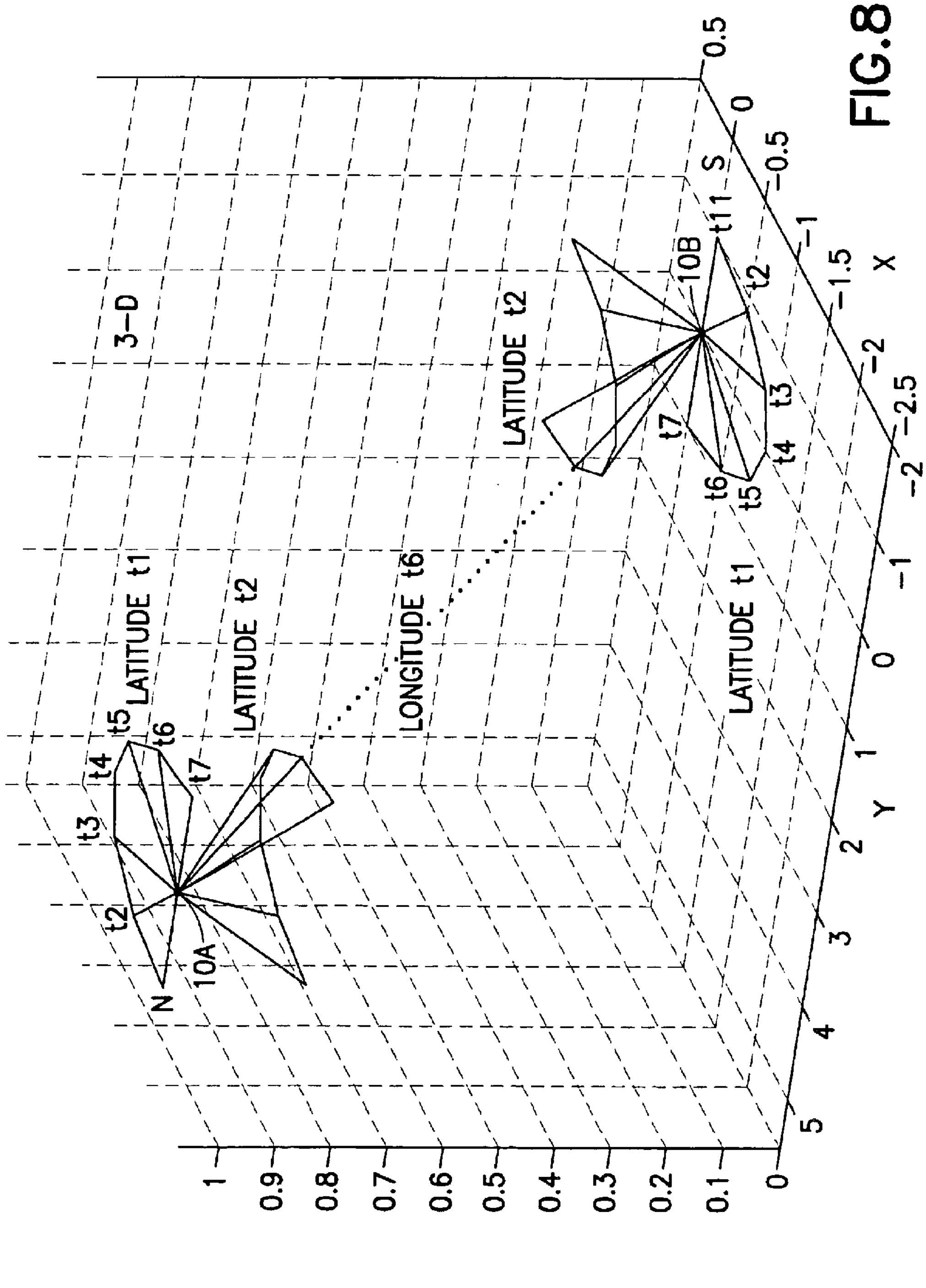
Figure 9:
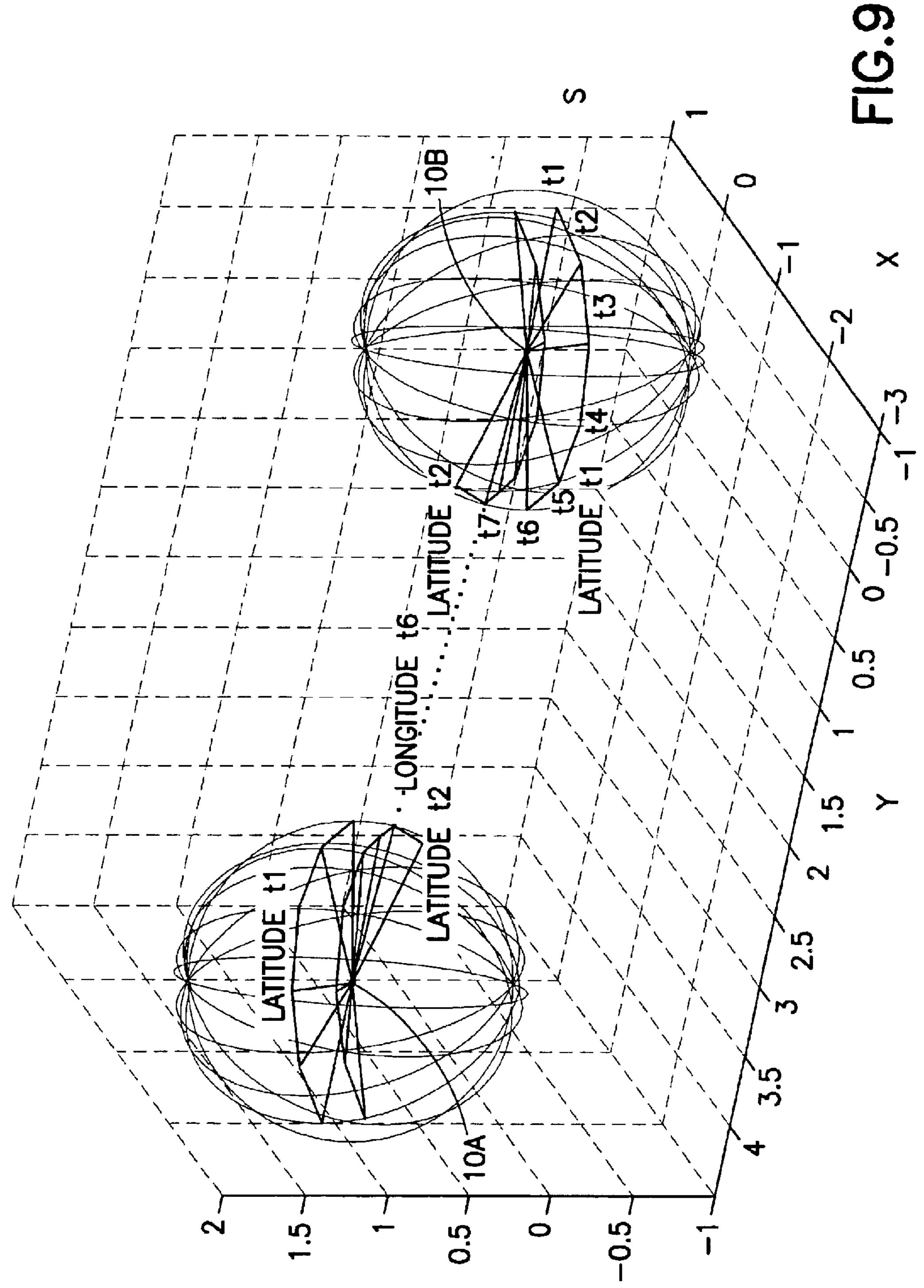
Figure 10:
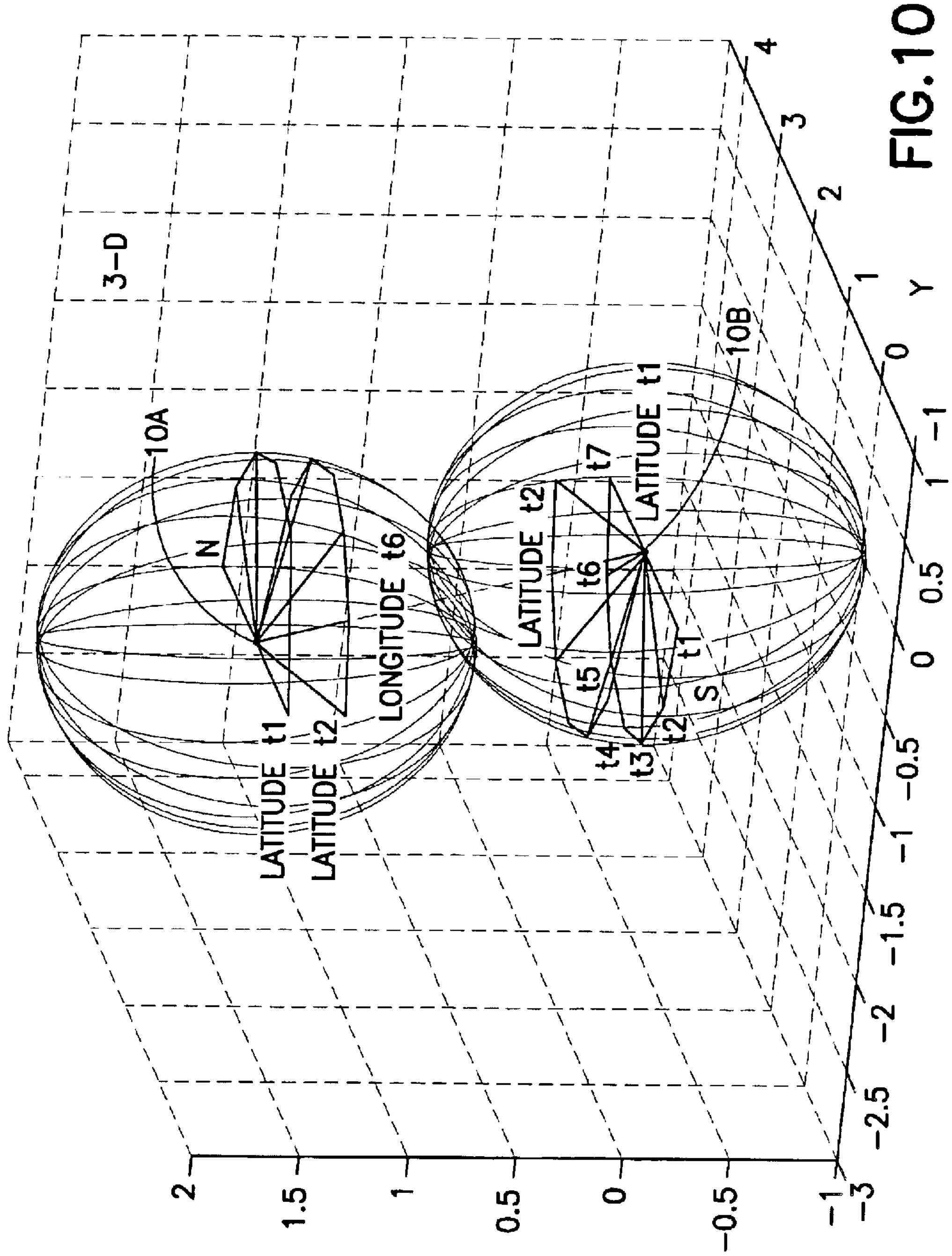

FIGS. 4 and 5 illustrate another air-to-air acquisition example, where both platforms lie in the same tangent plane (the same elevation envelope), but at different points in space relative to one another (as compared to FIGS. 2 and 3) such that acquisition is detected at time T5. All other conditions are the same as in FIGS. 2 and 3, i.e., antenna 10A begins its search at T1 pointing North, while antenna 10B begins its search at T1 pointing South, and both proceed clockwise in 30 degree increments. FIG. 6 is another three dimensional view of the air-to-air acquisition example of FIGS. 4 and 5, and shows the search sphere 3 surrounding each antenna 10A and 10B.

FIGS. 7, 8, 9 and 10 illustrate an air-to-air, or a ground-to-air configuration example, where both antennas 10A and 10B must search through elevation as well as azimuth. In this case the search sphere 3 latitude (elevation) is incremented, as well as the longitude (azimuth). Also in this case the starting condition for the elevation is the same as that for azimuth, i.e., the two antennas 10A and 10B begin 180 degrees out of phase with one another. For example, one starts at latitude +90 degrees and the other starts at latitude −90 degrees (or, for example, one starts at latitude +45 degrees and the other starts at latitude −45 degrees). At each line of latitude (elevation) the lines of longitude (azimuth) are swept (e.g., as in FIGS. 1–6, starting 180 degrees out of phase with one another, and in the same CW or CCW direction). In the example of FIGS. 7–10 the subset is sufficiently small that the elevation search from +90 degrees to zero is eliminated for antenna 10A, and for antenna 10B the elevation search from −90 degrees to zero is eliminated. Acquisition occurs in this example at latitude time T2 and longitude time T6, when antennas 10A and 10B are within each one another's azimuth and elevation beamwidths.

Figure 11:
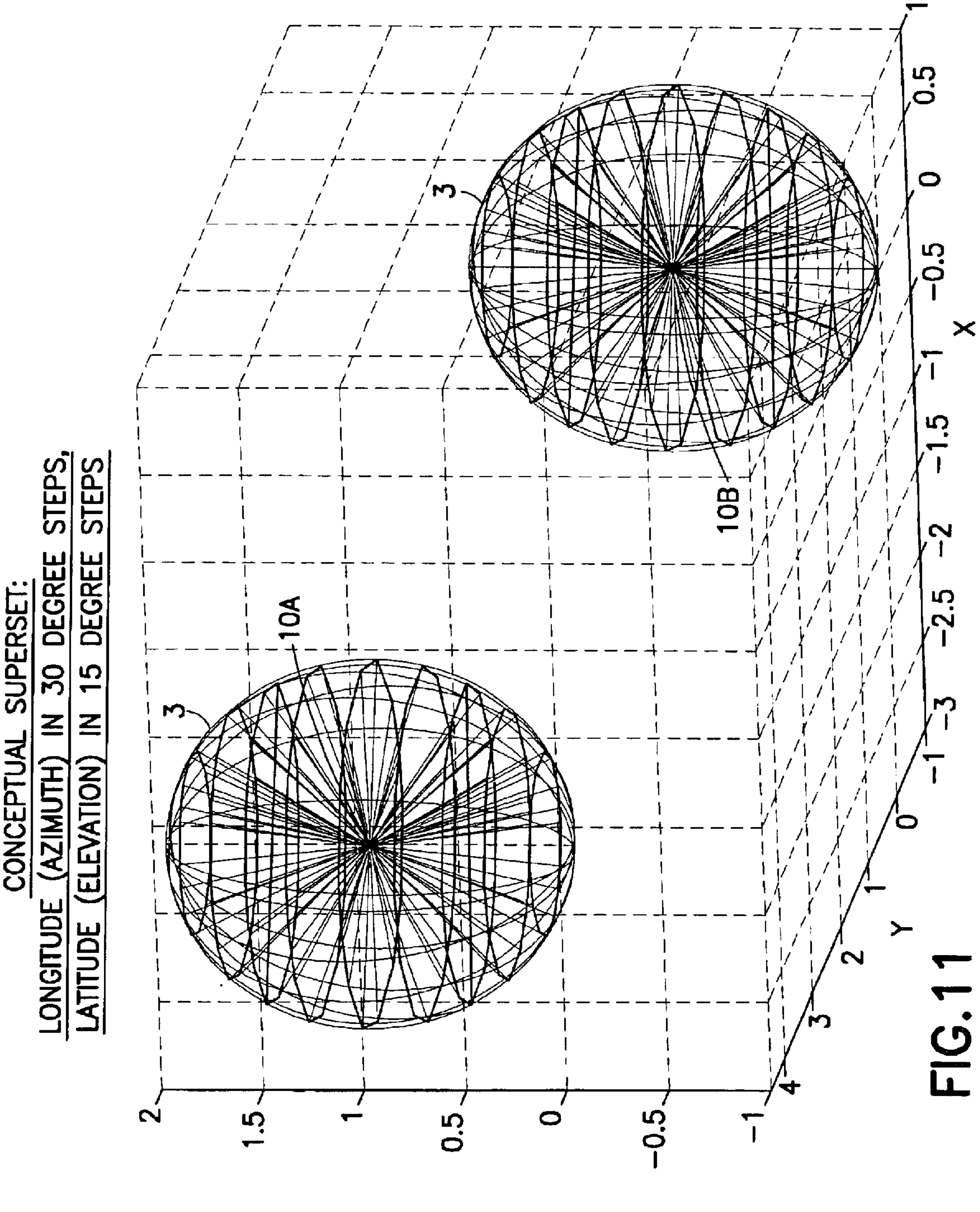
FIG. 11 illustrates the search sphere superset.

FIG. 11 illustrates the search sphere superset, and is plotted with elevation (latitude) in 15 degree steps and azimuth (longitude) in 30 degree steps. It can be appreciated that the examples shown in FIGS. 2–10 are subsets of the superset shown in FIG. 11. All search space around an antenna 10A and 10B is defined with latitude and longitude, and all search subsets are programmable using azimuth and elevation beamwidths and, if available (although not required), a priori knowledge of a partner's approximate location or physical limitations. Such a priori knowledge can be used to narrow the search space. For example, one platform may have altitude constraints that are known to the other. In this example each antenna search sphere 3 is referenced to Earth's true North and the local tangent plane 2, and the altitude (elevation) difference between the platforms does not influence the search routine.

Figure 12:
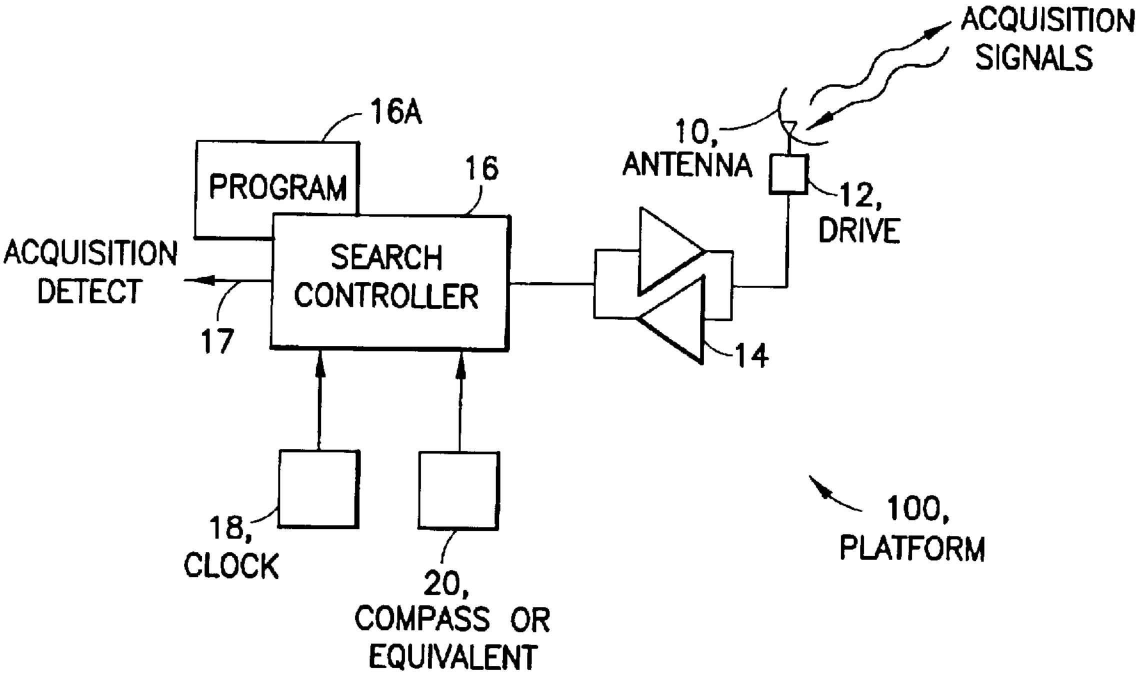
FIG. 12 is a simplified block diagram of a platform that includes an acquisition search controller that operates in accordance with this invention.

FIG. 12 is a simplified block diagram of a platform 100 that is constructed and operated in accordance with this invention. The platform 100 includes the antenna 10, shown in this case as a steerable dish antenna having an associated drive mechanism 12 and RF transceiver 14. In other embodiments the antenna 100 could be electronically steerable, such as in a phased array antenna that employs beamformers, while in other embodiments the RF antenna 10 could be replaced by an optical system using, for example, a laser transmitter and a laser receiver. In all such cases the means for transmitting and receiving an acquisition signal is referred to herein generically as an antenna. Further, and for a non-stationary platform 100, it assumed that the antenna drive 12 includes some means for stabilizing the antenna pointing with regard to the reference tangent plane 2 so that the motion(s) and direction of travel of the platform 100 can be taken out. A search controller 16 operates under the control of a stored program 16A to execute the spherical search pattern or the subset of the spherical search pattern in accordance with the examples shown in FIGS. 2–11, and includes a clock 18 and a compass or equivalent direction indicating device 20 referenced to the Earth-based coordinate system. As such, it can be appreciated that an aspect of this invention is a computer readable media, such as a memory device, a tape, or a disk that stores computer instructions that implement a computer program to cause a computer of the controller 16 to execute an acquisition method for use in establishing a LOS communication path between the first antenna 10A of a first platform and the second antenna 10B of the second platform. The controller 16 outputs an acquisition detect signal 17 when it receives energy from the antenna 10 of the other platform during the acquisition search procedure. In accordance with this invention this condition indicates that both antennas 10A and 10B are within the azimuth and elevation beamwidth of the other during a dwell time ($T_{DWELL}$), i.e., that both antennas 10A and 10B are currently pointing at one another. The acquisition detect signal 17 may applied to a tracking controller (not shown) to initiate and maintain, in a conventional manner, a LOS communication path or channel with the other platform.

It should be noted that in some embodiments the search controller 16 could be located remotely from the platform 100, e.g., at a ground station when the platform 100 is an aircraft or a spacecraft, and that communication between the controller 16 and the antenna 10, antenna drive 12 and transceiver 14 could be made through a wireless control link.

In any case, it should be appreciated that one or both of the platforms 100 could be a ground-based vehicle, a ground-based site that is fixed in location, a ship, an aircraft (manned or unmanned), or a space-based platform. In any of these embodiments the use of this invention enables the two platforms 100 to acquire the relative location of the other and to establish, if desired, a LOS communication path between the two platforms.

Figure 13:
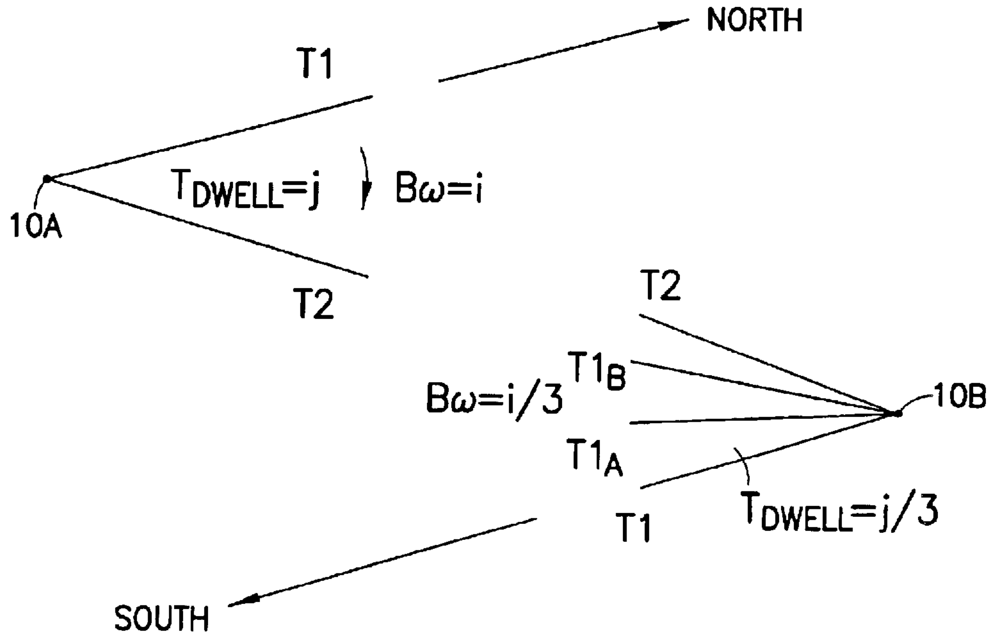
FIG. 13 is a diagram that is useful in explaining a case where the two antennas have unequal azimuth and/or elevation beamwidths.

While described thus far in the context of two antennas 10A and 10B having the same azimuth and elevational beamwidths, this is not a limitation on the practice of this invention. For example, and referring to FIG. 13, assume that antenna 10A has a beamwidth=i degrees and $T_{DWELL}$=j seconds, and that antenna 10B has a beamwidth=i/3 degrees. Thus, while antenna 10A is capable of performing BW=i steps, it performs BW=i/3 steps, and $T_{DWELL-MINIMUM}$ is the same for both antennas 10A and 10B. The difference in beamwidths can exist in azimuth, or in elevation, or in both.

In the most preferred embodiment all antennas 10 share the same value of $T_{DWELL}$ and move in the same degree increment steps, as established by the narrowest beamwidth antenna 10. Also, the minimum value of $T_{DWELL}$ is preferably fixed, and is determined by the underlying waveform structure and acquisition parameters of the search controller 16, and is thus a function as well of the signals transmitted and received by the antennas 10 during the execution of the method of this invention. For example, if the minimum amount of time required to receive, synchronize and lock to, and then demodulate (if necessary) the signal transmitted by the other antenna 10 is 50 milliseconds, then $T_{DWELL-MINIMUM}$ is 50 milliseconds.

In general, the superset spherical search as described above requires no a priori knowledge of the other antenna's relative location, and requires no particular rendezvous pattern. When an antenna design or platform placement restricts the pointing angle, elevation for example, the spherical search reduces to a subset of the spherical search, such as was shown in FIGS. 7–10 for a hemispherical search pattern, or the circular search in the local tangent plane 2, as was shown in FIGS. 2–6. In the latter case, and by example, only platform 100 heading is accounted for since elevation restrictions imply that roll and pitch movements are limited as well. The circular search in the local tangent plane 2, as shown in FIGS. 2–6, is thus a subset of the spherical case, where the constant latitude line of the sphere is 0 degrees (i.e., the equator of the spherical search pattern), and where each antenna 10A and 10B time-steps through its longitude (azimuth) as described above.

Further, when an antenna design or platform placement restricts the pointing angle, such as elevation, it is within the scope of this invention to provide an additional antenna 10. As an example, if the antenna 10 is physically located beneath the fuselage of an aircraft, and is thus restricted from scanning elevational angles above the fuselage, a second antenna could be located on top of the fuselage, and the two antennas could be operated together to obtain a full or nearly full range of elevation angle scanning.

The example of a circular search subset also applies if a priori knowledge is provided regarding relative altitude differences, in which case the acquisition search space may only need to span a circle at zero elevation (known elevation beamwidth establishes altitude differences for a given range). Other examples of subsets include the ground-to-air configuration where the ground or airborne platform 100 requires, at most, a hemispherical subset search as was described in FIGS. 7–10. While the number of possible spatial subsets are infinite, the 180 degree offset between initial antenna pointing directions applies in all sets. In any point-to-point configuration, the dwell time, platform velocities, minimum ranges and antenna beamwidth(s) affect which subset of the general superset spherical search applies.

It can be appreciated that the use of this invention does not require that the two platforms 100 move together, nor do they need to synchronize their motions relative to one another. The antenna search patterns of each platform have a common reference system, the tangent plane 2 that is in turn referenced to the surface of the Earth, enabling each platform 100 to freely move and maneuver during the acquisition search phase (so long as the antennas 10A and 10B operate within the common reference system, and are temporally synchronized).

The foregoing description has provided by way of exemplary and non-limiting examples a full and informative description of the best method and apparatus presently contemplated by the inventors for carrying out the invention. However, various modifications and adaptations may become apparent to those skilled in the relevant arts in view of the foregoing description, when read in conjunction with the accompanying drawings and the appended claims. As but one example, although described above in the context of first scanning in azimuth in a plane parallel to the reference tangent plane 2, and then incrementing the elevation angle before scanning in azimuth again, it is within the scope of this invention to first scan in elevation along a longitudinal plane that is orthogonal to the tangent plane 2, to then increment in azimuth, and scan again in elevation. However, all such modifications of the teachings of this invention will still fall within the scope of this invention.

Also, while described above primarily in the case of antennas 10 that step, this invention can also be practiced using antennas that continuously rotate, so long as the rotational speed of each is such that the antennas will simultaneously be within each other's beamwidths for the minimum $T_{DWELL}$.

Further, while the method and apparatus described herein are provided with a certain degree of specificity, the present invention could be implemented with either greater or lesser specificity, depending on the needs of the user.

Further still, some of the features of the present invention could be used to advantage without the corresponding use of other features. As such, the foregoing description should be considered as merely illustrative of the principles of the present invention, and not in limitation thereof.

What is claimed is:

1. A method for a first platform and a second platform to obtain information that is descriptive of a relative location of the other, comprising:

establishing an initial antenna pointing direction of the first and second platforms such that the pointing directions are opposite one another, the first and second platforms having a common time reference; and scanning each antenna in azimuth in the same direction in synchronism with one another in a plane referenced to a common reference plane until each antenna is within the other antenna's azimuth and elevation beamwidth during a scanning increment dwell time ($T_{DWELL}$).

2. A method as in claim 1, where upon completing a scan in azimuth in the plane, changing an elevation angle of each antenna pointing direction relative to the plane by equal and opposite amounts, and repeating the incremental scanning of each antenna in azimuth in the same direction.

3. A method as in claim 1, where the common reference plane is a plane that is tangent to the surface of the Earth.

4. A method as in claim 1, where a beamwidth of the first antenna differs from a beamwidth of the second antenna, where a minimum value of $T_{DWELL}$ is common for both antennas, and where a minimum antenna step size is a function of the smallest beamwidth.

5. A method as in claim 1, where the initial pointing directions are referenced to an Earth-based coordinate system.

6. An acquisition method for use in establishing a line-of-sight communication path between a first antenna of a first platform and a second antenna of a second platform, comprising:

defining a first spherical search space that is centered on the first antenna and a second spherical search space that is centered on the second antenna, each spherical search space being characterized by having lines of longitude corresponding to antenna azimuth pointing directions and lines of latitude corresponding to antenna elevation pointing directions, where an equatorial plane of each spherical search space is referenced to a plane that is tangent to the surface of the Earth;

establishing an initial antenna pointing direction of the first and second antennas such that the pointing directions are opposite one another referenced to an Earth-based coordinate system; and operating within the spherical search space or a subset of the spherical search space by incrementally scanning each antenna in azimuth in the same direction in synchronism with one another, and upon completing a scan in azimuth, changing an elevation angle of each antenna relative to the equatorial plane by equal and opposite amounts in synchronism with one another, and repeating the incremental scanning of each antenna in azimuth in the same direction until each antenna is within the other antenna's azimuth and elevation beamwidth during a scanning increment dwell time ($T_{DWELL}$).

7. A method as in claim 6, where a beamwidth of the first antenna differs from a beamwidth of the second antenna, where a minimum value of $T_{DWELL}$ is common for both antennas, and where a minimum antenna step size is a function of the smallest beamwidth.

8. Apparatus for use on a first platform and on a second platform for enabling each platform to obtain information that is descriptive of a relative location of the other platform, each platform comprising an antenna and coupled to the antenna a controller operating under control of a stored program for establishing an initial antenna pointing direction of the antenna such that initial pointing direction is opposite to the initial pointing direction of the antenna of the other platform, said controller further incrementally scanning the antenna in azimuth in the same direction in synchronism with the scanning of the other antenna in a plane referenced to a common reference plane until each antenna is within the other antenna's azimuth and elevation beamwidth during a scanning increment dwell time ($T_{DWELL}$).

9. Apparatus as in claim 8, where said controller is responsive to completing a scan in azimuth in the plane for changing an elevation angle of the antenna pointing direction relative to the plane by an equal and opposite amount as the other antenna, and repeats the incremental scanning of the antenna in azimuth.

10. Apparatus as in claim 8, where the common reference plane is a plane that is tangent to the surface of the Earth.

11. Apparatus as in claim 8, where a beamwidth of the first antenna differs from a beamwidth of the second antenna, where a minimum value of $T_{DWELL}$ is common for both antennas, and where a minimum antenna step size is a function of the smallest beamwidth.

12. Apparatus as in claim 8, where the initial pointing directions are referenced to an Earth-based coordinate system.

13. Apparatus as in claim 8, where the controller associated with the first platform and the controller associated with the second platform operate with a common time reference.

14. A computer readable media that stores computer instructions implementing a computer program to cause the computer to execute an acquisition method for use in establishing a line-of-sight communication path between a first antenna of a first platform and a second antenna of a second platform, comprising:

program instructions defining a first spherical search space that is centered on the first antenna and a second spherical search space that is centered on the second antenna, each spherical search space being characterized by having lines of longitude corresponding to antenna azimuth pointing directions and lines of latitude corresponding to antenna elevation pointing directions, where an equatorial plane of each spherical search space is referenced to a plane that is tangent to the surface of the Earth;

program instructions for establishing an initial antenna pointing direction of the first and second antennas such that the pointing directions are opposite one another referenced to an Earth-based coordinate system; and program instructions for operating within the spherical search space or a subset of the spherical search space by incrementally scanning each antenna in azimuth in the same direction in synchronism with one another, and upon completing a scan in azimuth, changing an elevation angle of each antenna relative to the equatorial plane by equal and opposite amounts in synchronism with one another, and repeating the incremental scanning of each antenna in azimuth in the same direction until each antenna is within the other antenna's azimuth and elevation beamwidth during a scanning increment dwell time ($T_{DWELL}$).

15. A computer readable media as in claim 14, where a beamwidth of the first antenna differs from a beamwidth of the second antenna, where a minimum value of $T_{DWELL}$ is common for both antennas, and where a minimum antenna step size is a function of the smallest beamwidth.

* * * * *